I. BOYSEN.
RETOUCHING SCREEN.
APPLICATION FILED APR. 1, 1920.
1,343,613.  Patented June 15, 1920.
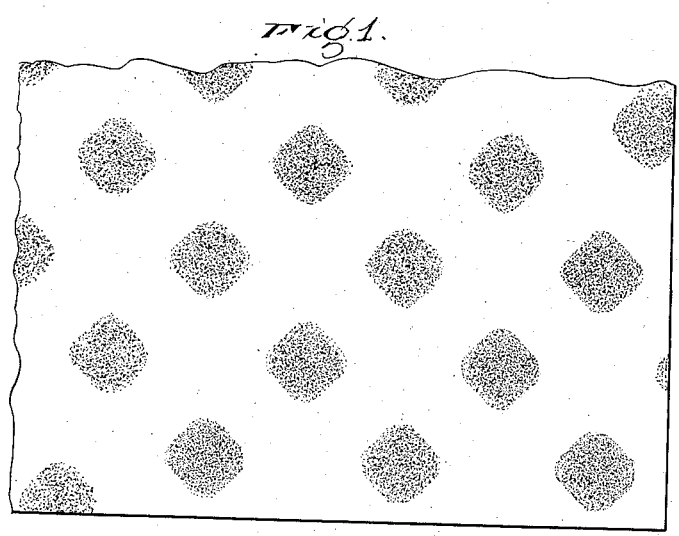
Fig. 1.
Fig. 2.
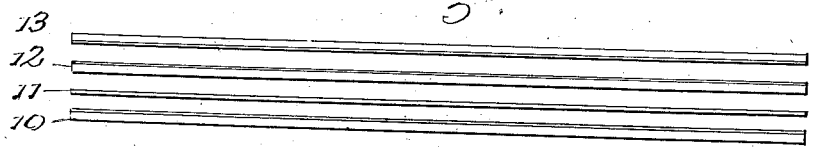
PROPRIETOR
Iwer Boysen
BY
Richard B. Owen,
ATTORNEY

UNITED STATES PATENT OFFICE.

IWER BOYSEN, OF NEW YORK, N. Y.

RETOUCHING-SCREEN.

1,343,613.  Specification of Letters Patent. Patented June 15, 1920.

Application filed April 1, 1920. Serial No. 370,564.

*To all whom it may concern:*

Be it known that I, IWER BOYSEN, a citizen of the United States, residing at New York city, in the county of New York and State of New York, have invented certain new and useful Improvements in Retouching-Screens, of which the following is a specification.

This invention has relation to photographic printing, and has for its object to provide what I term a "photographic retouching screen," designed primarily for use in professional portrait photography to impart a retouched effect to a print without the necessity of performing a finished retouching operation upon the negative, a slight amount of retouching being all that is necessary to secure upon the resultant print a perfectly modeled and softened effect equivalent to that produced by a fully retouched negative.

Another object of the invention is to provide a "retouching screen" in the form of a sheet of transparent material such as celluloid, for instance, having upon its surface a field of slightly opaque dots which are uniformly spaced, and which are of a configuration designed to produce a perfect result and which will be hereinafter more fully described.

In the accompanying drawing in which similar reference characters are used to designate corresponding parts throughout the several views in which they appear;

Figure 1 is a view in elevation of a fragment of my "retouching screen" showing the dots on a greatly magnified scale, and Fig. 2 is a diagrammatic view showing the various elements in edged view used in a printing operation with the use of my "retouching screen."

A step preliminary to the employment of my new method of photographic printing consists in the preparation of my "retouching screen." This screen is prepared with the aid of what is known as the photo-engraving screen which consists of a thick glass plate or slab having inscribed upon its surface certain markings which may be described as a plurality of sharply defined square, semi-opaque dots arranged in rows diagonally across the screen, the dots being uniformly spaced one from another. I set the photo-engraver's screen before a camera having an exceptionally fine lens and then make a negative of the screen upon a sensitive photographic plate. While the plate employed may be an ordinary commercial dry plate, I have found in practice that the most perfect results are obtained by preparing the sensitive plate in accordance with the old wet plate process. After exposure the plate is developed and dried. The resultant negative is employed to make my "retouching screen" in the following manner:—The film side of the negative and the sensitive side of a sheet of sensitized celluloid are placed in contact and the whole exposed to the light as in photographic printing. The exposed celluloid sheet is then developed, resulting in a positive which is practically a facsimile of the photo-engraver's screen mentioned above. There is some difference however, and an attempt has been made to show in Fig. 1 the appearance the dots should have in order that the screen may be capable of performing the desired results. By examination of Fig. 1, which shows a fragment of my "retouching screen" on a greatly magnified scale, it will be seen that it consists of diagonally arranged rows of semi-opaque dots upon the clear transparent field of the celluloid. These dots, however, are not absolutely square with sharply defined contours but only substantially square; that is, the corners are rounded off and the sides are not sharply defined, but merge off into the clear spaces between the dots. In other words, the center portion of each dot is the darkest or most opaque, but this semi-opaque surface extends very nearly to the edges of the dot where it then merges off gradually and decreases in opaqueness into the clear portion or spaces between the dots. The essential feature of the present invention consists in the exact shape and nature of these dots since if they were not formed as described above, or if they were sharply defined for instance, the proper effects could not be secured and, in fact, the screen would be totally useless to produce any artistic effect. It will also be noted that the dots are spaced from each other to a distance equal to the width of any block. In practice, the dots, should be very small and a row including about 85 dots should not be more or less than one linear inch in length. As a geometrical proposition, if a surface is accurately divided into squares and alternate squares in a row blackened with sharply defined edges it will be seen that the distance between adjacent corners of diagonally opposite black squares will correspond to the diagonal length of any block, or square. And, if a portion of the surface is selected so as to include substantially an equal number of white and black squares, it will be found that the proportion of black squares to the white squares will be as four to five. Therefore, the proportionate area of black surface will be four, as compared to the total white area which will be five. To return to Fig. 1, since the corners of each semi-opaque square are rounded, the distance between adjacent rounded corners of diagonally opposed squares will be greater than the diagonal or distance between the corners of any square taken diagonally thereacross. It follows, therefore that the "retouching screen" will present a slightly greater proportion of clear surface than the proportion of 4; 5 which is present in the geometrical proposition mentioned above. It is impossible to define the exact proportion or relation between the total areas of semi-opaque and clear surfaces in the "retouching screen," but the success of the screen is partly due to this scientific fact.

In use, a negative to be printed in conjunction with my screen is first given a slight amount of retouching, but the operation is not carried any where near the point demanded of a completely or fully retouched negative. I prefer to employ a sheet of pink, clear celluloid, the color being rather faint. This sheet is indicated at 11, and the negative at 10 in Fig. 2. The pink celluloid is laid upon the film side of the negative. I then take my "retouching screen" and lay the same upon the pink celluloid with the film side of the screen, or the side having the squares thereon presented upward. The screen is indicated at 12. I then take a sheet of printing paper indicated at 13 and lay the same, sensitive side downward upon the screen. In this manner the sensitive side of the paper and the film side of the "retouching screen" are in contact. The whole is then exposed to the light in the usual manner and the printing paper subsequently developed. The resultant print will show upon very close examination with a magnifying glass a uniform field of minute white or partly white dots, but the print viewed without an accessory will present a perfectly modeled and shaded effect which, without the use of the "retouching screen" could only have been obtained by fully retouching the negative. In a portrait the hard lines and shadows, ordinarily eliminated by extensive retouching will be entirely obliterated. The only retouching necessary on the negative will be what is known as "proof retouching." The effect on the print of the "retouching screen" is also similar to stippling, a form of touch used by expert retouchers to obtain smooth and finely modeled effects. Owing to the fact that the dots of the screen are uniformly spaced and all of the same size a stippled effect can be obtained with the "retouching screen" that could not be duplicated by the most expert and skilled retoucher. In attempting to secure fine modeling many retouchers have to carry the process to such a stage that the most essential characteristics of a face are destroyed and the resultant picture, while an artistic production is nevertheless not an accurate or faithful likeness of the subject. With the use of my "retouching screen" such extensive retouching is not necessary and hence the resulting print will not only present a true likeness of the subject, but will also possess all the artistic merit of a picture made from a fully retouched negative. Outside of the considerations of art there is a considerable saving of time since the amount of retouching necessary with the use of my screen will occupy only a few minutes, while to fully retouch a negative would require an hour or more. The "retouching screen" may be used to good advantage without the pink sheet of celluloid, but I have found in practice that better results are obtainable with its use. The effect of the pink sheet is to retard somewhat the time of printing, but the longer exposure to the light thus necessitated in some way not fully known to me permits the "retouching screen" to act more favorably upon the print and better modeling is the result.

Having thus described my invention, what I claim as new and desire to secure by United States Letters Patent is:

1. A photographic retouching screen comprising a sheet of thin transparent material having upon one face a field of semi-opaque dots arranged in diagonal rows, each dot being substantially square but with the corners rounded off.

2. A photographic retouching screen comprising a sheet of thin transparent material having upon one face a field of semi-opaque dots, each dot being substantially square but with the corners thereof rounded and the defining edges of said corners and sides of the dots indistinct and merged off into the clear spaces between the dots.

3. A photographic retouching screen comprising a sheet of thin transparent material having a film upon one side of prepared, exposed and developed photographic gelatin said film having a uniform field of semi-opaque dots thereon arranged diagonally relative to the sides of the sheet, each dot being substantially square but with its corners well rounded off and the sides and said corners of each dot rendered indistinct and illy defined so as to merge the said sides and corners into the clear spaces between the dots, said dots being spaced one from another to a distance corresponding the width of a dot and of a size to include approximately eighty five dots to a linear inch.

In testimony whereof I affix my signature in presence of a witness.

IWER BOYSEN.

Witness:
WM. ZEAMAN.